Oct. 26, 1943.                C. W. MOTT                2,332,740
          CONTROL MECHANISM FOR FLUID-ACTUATED DEVICES
                    Filed Aug. 20, 1941         3 Sheets-Sheet 1
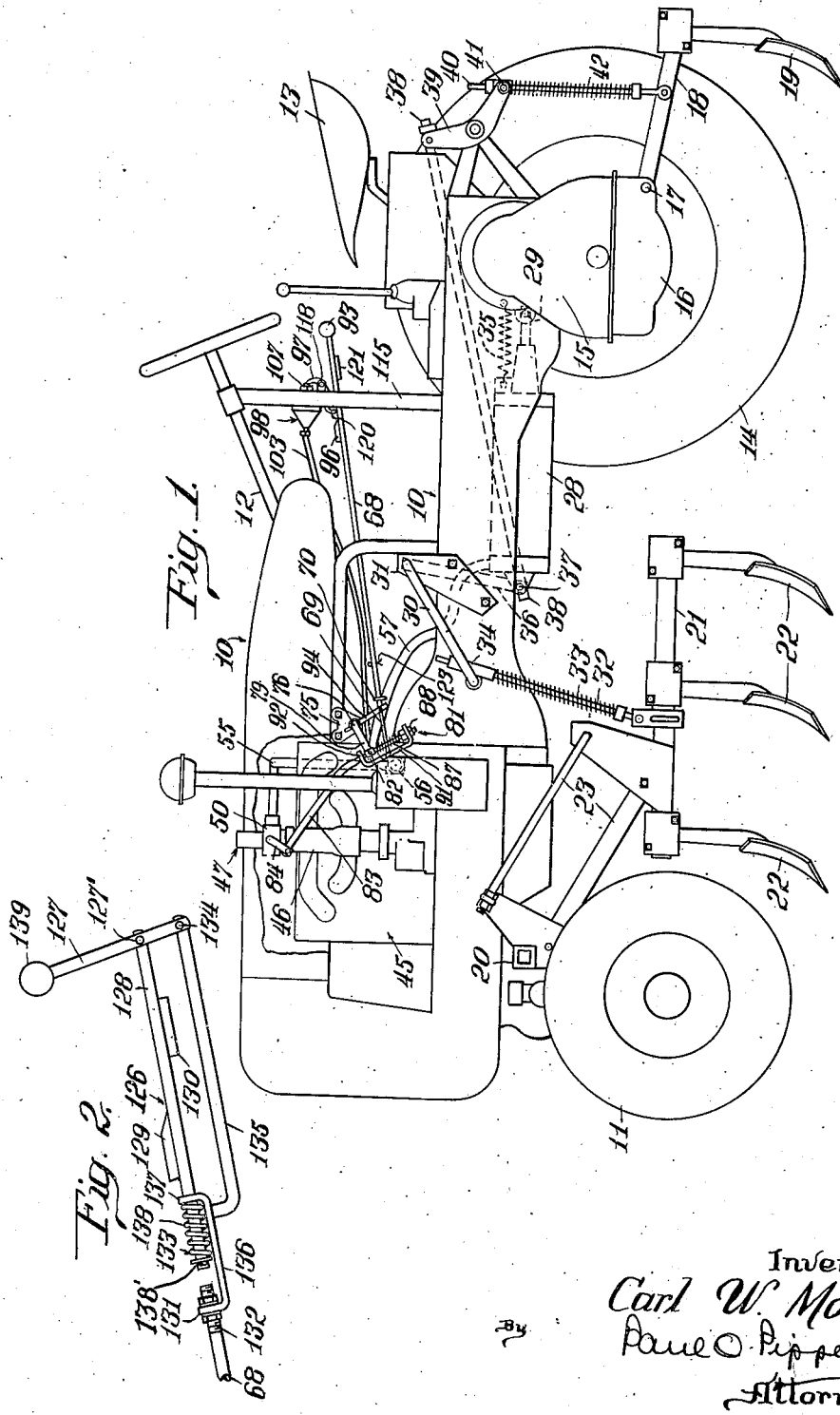
Inventor
Carl W. Mott
Paul O. Pippel
Attorney Oct. 26, 1943.  C. W. MOTT  2,332,740
CONTROL MECHANISM FOR FLUID-ACTUATED DEVICES
Filed Aug. 20, 1941  3 Sheets-Sheet 2
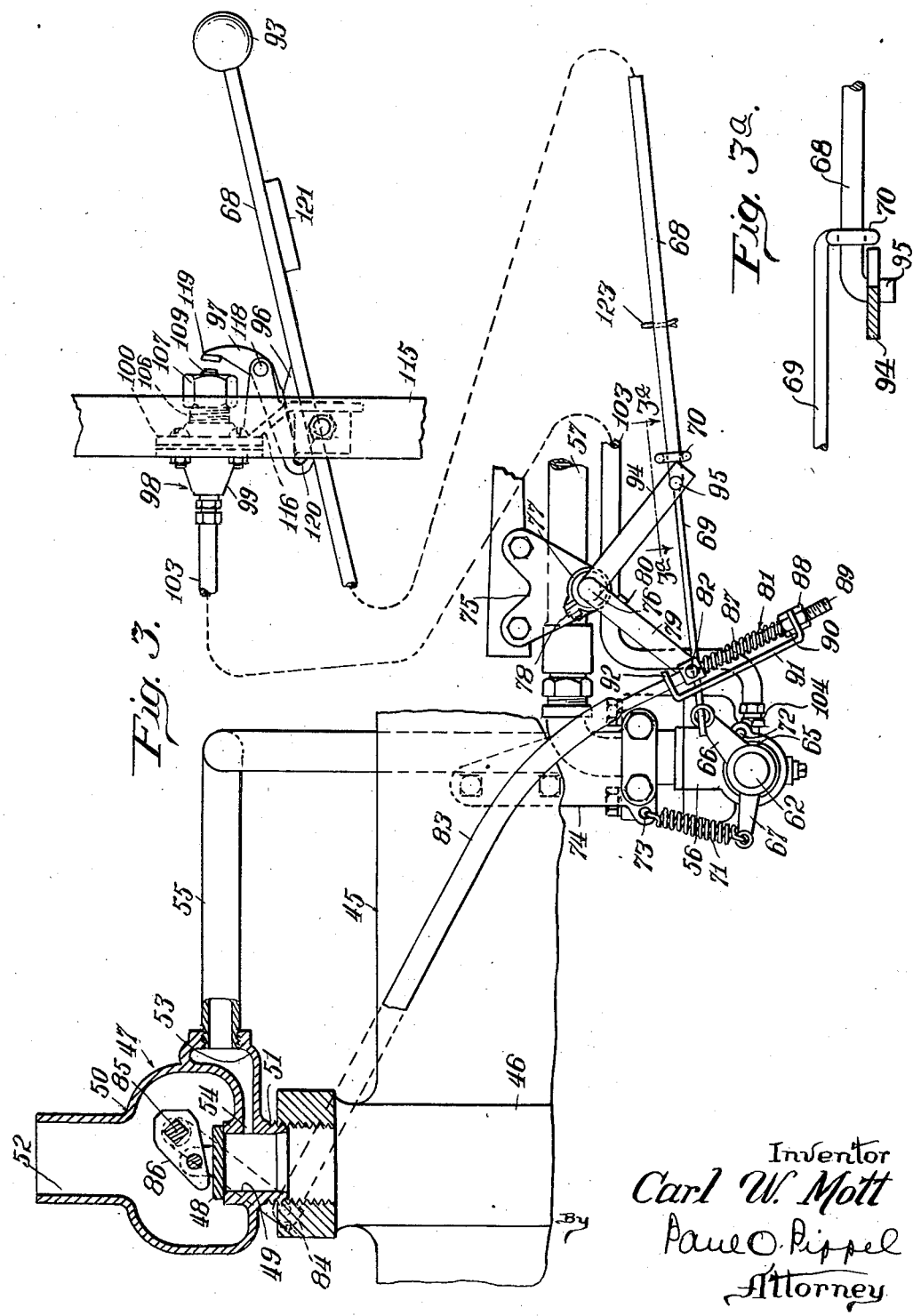
Inventor
Carl W. Mott
Paul O. Pippel
Attorney Oct. 26, 1943.       C. W. MOTT       2,332,740
CONTROL MECHANISM FOR FLUID-ACTUATED DEVICES
Filed Aug. 20, 1941       3 Sheets-Sheet 3
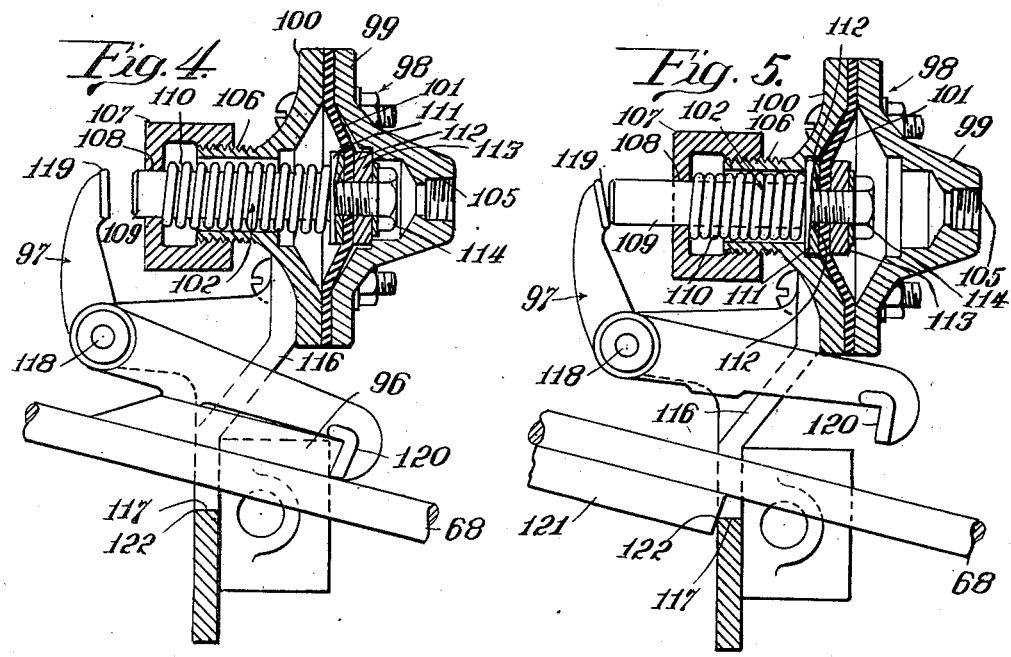
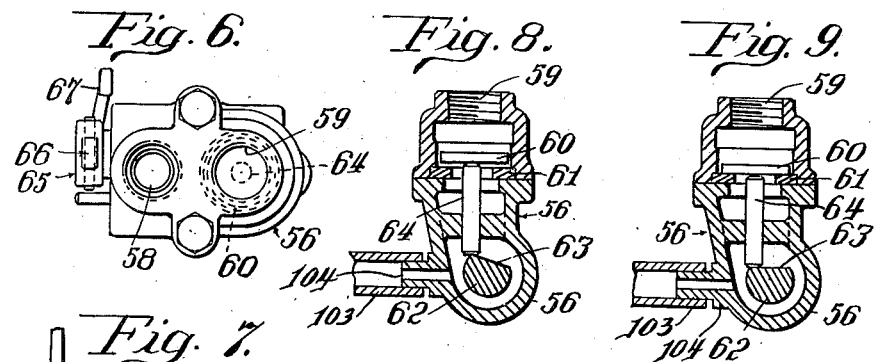
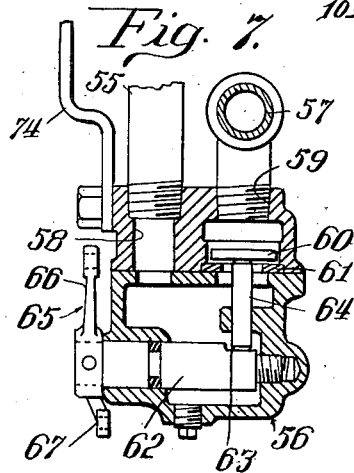
Inventor
Carl W. Mott
Paul O. Pippel
Attorney Patented Oct. 26, 1943

2,332,740

UNITED STATES PATENT OFFICE 2,332,740

CONTROL MECHANISM FOR FLUID-ACTUATED DEVICES

Carl W. Mott, La Grange, Ill., assignor to International Harvester Company, a corporation of New Jersey Application August 20, 1941, Serial No. 407,559

9 Claims. (Cl. 60—15)

This invention relates to control mechanism for fluid-actuated devices and more particularly to automatic control mechanism particularly adapted for use with fluid-actuated devices adapted to be operated by exhaust fluid from an internal combustion engine source.

It is an object of the invention to provide a control mechanism adapted to be operated by exhaust gases from an internal combustion engine with an automatic pressure releasable means, whereby the mechanism may be returned to a neutral position automatically after the fluid-actuated devices have been operated to perform work upon parts adapted to be moved.

It is another object of the invention to provide in a control mechanism for fluid power arrangements a linkage which has within itself a spring biased means serving jointly to place a spring bias upon the valve means operated by the linkage and to maintain the control mechanism latched against a stop means.

It is another object of the invention to provide an automatic releasable means which is adapted to be located in a position removed from other parts of the control mechanism so that it may serve as a stop means for a manually operable control element.

It is another object of the invention to provide in a control mechanism a manually operable lever so connected to the manually operable control mechanism as to provide a mechanical advantage upon the manually operable control mechanism being operated to be latched over a stop means against the action of a spring whereby the control mechanism may be more easily operated.

According to the present invention, there has been provided in the control mechanism for operating the valves serving to control the delivery of fluid to a fluid-actuated device, a linkage having spring biased lost-motion connection means within itself which is adapted to be stretched as the control mechanism is manually operated so as to retain the control mechanism against a stop means once having been operated. This spring biasing means also serves to place a bias upon the valve which has been operated by the control mechanism thereby providing a safety arrangement which will permit the valve to open upon undue pressure being created in the fluid arrangement, and to insure the positive closing of the valve. Associated with this control mechanism is an automatic release device operable after the fluid-actuated device has been operated to release the control mechanism so that it may be returned to a neutral position. This releasable device is so constructed that it can be located in a position removed from the other parts of the fluid mechanism and where it serves as a stop means for the manually operable control element. In another form of the control mechanism there is provided means on the manually operable control rod for reducing the amount of effort required to operate the manual means against the action of the spring biasing means. This last-mentioned means takes the form of a lever pivoted to have a mechanical advantage so that the operator need not exert the full force required to compress the spring biased lost-motion connection means provided in the control linkage. This control mechanism has particular adaptation for use with a fluid power arrangement utilizing exhaust fluid from an internal combustion engine to perform work upon parts adapted to be moved from one position to another, such as of a type shown in the present inventor's copending application, Serial No. 353,099, filed August 17, 1940, and relating to power arrangements for agricultural implements. The present invention renders the prior arrangement shown in the above application more automatic and more efficient in its operation.

For other objects and for a better understanding of the invention reference may be had to the following detailed description taken in connection with the accompanying drawings, in which:

Figure 1 is a view in elevation of a tractor having an internal combustion engine with an exhaust outlet and of a fluid power arrangement embodying the features of the present invention for receiving the fluid from the exhaust gas outlet to effect movement of implements mounted on the tractor;

Figure 2 is a detailed view of a modified form of control rod;

Figure 3 is an enlarged view partly in section of the control mechanism for the fluid-actuated devices;

Figure 3ª is a fragmentary view taken on the line 3ª—3ª in Figure 3, showing details of a linkage;

Figure 4 is a view partly in section of the pressure releasable device set to retain the control rod in its latched position;

Figure 5 is a view similar to Figure 4 of the automatic release device with its locking element out of connection with the control rod; and, Figures 6 to 9, inclusive, are detailed views of the check valve mechanism serving as a part of the fluid arrangement.

Referring now particularly to Figure 1, there is shown a tractor 10 having a forward wheel-supporting structure 11 adapted to be operated by a steering mechanism 12 accessible to an operator's station 13 on the rear of the tractor 10. The rear portion of the tractor 10 is supported on the tractor drive wheels 14 adapted to receive power from a rear axle structure 15. The rear axle structure 15 has depending axle housings 16 to which is pivoted as at 17 a rear implement 18 having a working tool 19 thereon. Connected to the forward part of the tractor is a laterally extending bracket structure 20 to which is connected a forward implement 21 having working tools 22. The forward implement 21 is connected to the bracket structure 20 by means of parallel links 23, and it will thus be apparent that the same is adapted for vertical movement to and from its ground-working position.

As a means for moving the forward and rearward implements, there is provided a fluid-actuated device 28 anchored to the rear axle structure 15 at 29 and adapted to be extended in length, the same taking the form of a cylinder with a working piston therein. The movable part of the fluid-actuated device is connected by means of a rockable structure 30 to the forward implement structure 21. This rockable structure 30 is mounted midship on the tractor by a bracket 31. The rockable arm structure rocks with respect to the bracket 31 and is connected to the forward implement by means of a lift rod 32 having a pressure spring 33 thereon. This pressure spring 32 reacts against a trunnion element 34 on the rockable structure 30 to place pressure on the implement structure 21 to hold the working tools 22 in their ground-working position. The fluid-actuating device 28 is of the single-acting type and as a means for maintaining the same collapsed so that the pressure spring 33 can be effective, there is provided a heavy master spring 35 connected between the cylinder part of the fluid-actuated device and the rear axle structure 15. The rockable arm structure 30 is connected to the fluid-actuated device by means of an arm 36 connected as indicated to the fluid-actuated device as at 37. Also at 37 there is connected a rearwardly extending rod 38, which serves to simultaneously pivot a rockable structure 39 mounted on the rear axle structure 15 for pivotal movement and connected to a lifting rod 40 which is in turn connected to the rear implement 18. The rockable member 39 also has a trunnion 41 against which a pressure spring 42 may react to hold the rear working tool 19 in its ground-working position. It should now be apparent that when the fluid-actuating device 28 is actuated, both the forward and rearward implements are raised in unison out of their ground-working positions.

The tractor 10 has an internal combustion engine 45 adapted for primarily propelling the rear drive wheels 14. Said engine has an exhaust gas outlet means 46 for normally dissipating the exhaust gases to the atmosphere. The engine and its exhaust gas outlet serve as a means for providing a fluid source sufficient to effect operation of the fluid-actuated device 28. The following description will be directed to the control mechanism adapted to control the flow of fluid to and from the fluid-actuated device 28.

In the exhaust gas outlet means 46 is provided a valve means 47 shown more in detail in Figure 3. This valve means 47 includes a closure plate 48 adapted to fit over an opening 49 provided in a hollow casting 50. The casting 50 has a threaded portion 51 adapted to be threaded into the exhaust outlet means 46. Exhaust fluid normally flows through the opening 49, past the plate 48, and through an opening 52 in the upper part of the casting 50 for its dissipation to the atmosphere. When it is desired to operate the fluid-actuated device, means is provided for causing the closure plate 48 to fit over the opening 49. When this is done, the exhaust fluid is diverted into a chamber means 53 provided in the casting 50 near to the opening 49, the chamber 53 being in communication therewith, as indicated at 54. From the chamber 53 fluid is delivered through a pipe or fluid communication means 55 to a check or trap valve device 56. From this check valve device 56 fluid is delivered through a pipe or hose connection 57 to the fluid-actuated device 28.

The trap valve device 56, as shown more clearly in the various views of Figures 6 to 9, inclusive, serves to retain the fluid in the fluid-actuated device 28. The fluid enters the device through an opening 58 and leaves the device through an opening 59. Within the opening 59 is provided a closure or valve plate 60 adapted to normally fit upon the valve seat 61. As the fluid passes through the device 56, the plate 60 will separate automatically from the valve seat 61 to permit the fluid to pass to the fluid-actuated device. When the fluid source is cut off, the plate 60 will set itself on the valve seat 61 and there be retained by the pressure in the fluid-actuated device. Associated with this check valve device 56 is a means for operating the plate 60 so as to cause return of the fluid from the fluid-actuated device. This means includes a rockable cam shaft 62 having a flat portion 63 in vertical alinement with the closure plate 60 and which supports a pin 64 arranged to contact the plate 60 to lift it from its seat upon the pin being moved upwardly and vertically. The cam shaft 62, as will be seen in Figures 8 and 9, is somewhat offset with respect to the pin 64, so that as the cam shaft 62 is rotated the outer edge of the flattened portion 63 will be rotated about the axis of the shaft so as to effect the lifting of the closure plate 60, this operation being illustrated particularly in the Figures 8 and 9. The cam shaft 62 has secured thereto an arm piece 65 for the purpose of operating the same. This arm piece 65 has two arm portions 66 and 67. The arm portion 65 serves as a means for the connecting of the valve with a fore and aft movable control rod 68. The connection with the control rod 68 is through a link element 69 slidable on the control rod 68 by means of a loop formed upon its end, as indicated at 70 in Figures 3 and 3ª. The arm portion 67 is adapted for the connection thereto of a spring 71, which tends always to maintain the cam shaft 62 rotated to the position shown in Figure 9, wherein the closure plate will be allowed to remain on its seat 61. This spring tends to rotate the shaft in a clockwise direction and to maintain the arm 66 against a stop pin 72. So long as the shaft is maintained in this position, fluid passes to the fluid-actuated device 28 where it is normally retained, since the valve plate 60 remains on the seat portion 61. The spring 71 is fastened as indicated at 73 to the check valve device. The check valve device is supported on the tractor by a supporting bracket 74.

Also fastened on the tractor is a second supporting bracket 75 which serves as a journal portion for a rockable arm structure 76. This arm structure is normally maintained in its clockwise rotated position by means of a coil spring 77 adapted to react against a lug 78 on the supporting bracket 75. The opposite end of the coil spring bears against a forwardly extending arm 79, forming a part of the rockable structure 76, as indicated at 80. The arm 79 extends downwardly at the left side of the tractor for connection with a spring biased lost-motion connection means 81. On the outer end of the arm 79 is a trunnion element 82 slidable on a link 83 connecting the arm structure 76 with an arm 84 used for operating the closure plate 48 in the gas outlet casting 50. The arm 84 is rigidly connected to a shaft 85 pivotable in the casting 50 and on which is an arm 86 connected with the closure plate 48. As the link 83 is pulled rearwardly by counter-clockwise rotation of the arm 79, the closure plate 48 is lowered to close the opening 49. Since the trunnion 82 is slidable on the link 83 and is only resisted by a spring 87 forming a part of the spring biased lost-motion connection means 81, the plate 48 will be retained on its seat by the spring 87, the arm structure 76 having been rotated and rigidly held in a fixed position in a manner to be afterwards described.

As a means for varying the amount of spring pressure supplied to the closure plate 48 by the spring 87, there is provided an adjusting means 88 on the rearward end of the link 87. The rearward end of the link 87 is threaded, as indicated at 89, and has adjusting nuts 90 thereon. As these adjusting nuts 90 are adjusted, the effectiveness of the spring 87 is varied. Retained on the link 83 by means of the adjusting nuts 90 is a stop piece 91 having a portion 92 against which the trunnion 82 may bear to effect forward movement of the link 83 as when it is desired to release the closure plate 48. This forward movement of the link 83 is effected to some extent by means of the spring 77 on the pivotal structure 76 when the same has been released from its counter-clockwise rotated position.

When it is desired to effect operation of the fluid-actuated device 28, the pivotable structure 76 is rotated in a counter-clockwise direction by the manual control rod 68. This control rod 68 has a handle portion 93 accessible to the operator's station 13. The pivotal arm structure 76 has a second and rearwardly extending arm portion 94 located on the right side of the tractor and connected to the control rod 68 as indicated at 95. Since the trap valve device 56 is also located on the right side of the tractor, the control rod 68 is in position to receive the rod 69 connected to the arm 66 of the trap valve device. The rod 68 is pulled rearwardly by the operator until a lug portion 96 thereon engages with a locking arm 97 of an automatic releasable device 98. In pulling the rod rearwardly the closure plate 48 covers the opening 49 and spring pressure will be placed on the closure plate 48 by means of the spring biasing lost-motion connection means 81. Also, this spring biased lost-motion connection means will serve to some extent to retain the lug portion 96 of the control rod 68 against the locking element 97. It should thus be apparent that there has been provided an extensible linkage including a lost-motion connection means which has the double function of placing spring pressure on the closure plate 48 and for maintaining the control rod 68 against a stop means 98.

Referring now particularly to Figures 4 and 5, there is shown in detail the automatic releasable device 98. This device includes two housing parts 99 and 100 between which is maintained a diaphragm 101 which in turn carries a plunger mechanism 102. To effect operation of the diaphragm, connection is made by means of a hose connection 103 with the fluid pressure source. This fluid pressure source is found in the trap valve device 56, and thus the hose connection 103 is connected to the trap valve device outlet means 104. The hose connection 103 is connected with an opening 105 in the part 99 and fluid pressure is placed upon the right side of the diaphragm 101 and when applied will cause the same to be moved to the left to assume the position shown in Figure 5. The part 100 has a threaded portion 106 on which is threaded a cap 107 having an opening 108 through which extends the plunger element 109 of the plunger mechanism 102. Against the inner face of the cap member 107 bears a spring 110 coiled about the plunger pin element 109 and serving to normally maintain the diaphragm 101 in its inoperative position shown in Figure 4. By having the cap element 107 threaded to the part 100, an adjustment of the spring pressure may be made. This adjustment serves as a means whereby the automatic releasable device 98 may be readily adjusted for operation depending upon the different types of tools mounted on the tractor. Each of the tools have different weights and the automatic release will have to be varied to be effective at the proper time for release of the control rod 68 after the working tools have been moved to their raised position. The pin element 109 has at its rearward end a flange 111 for connection with the diaphragm 101 and a threaded opening 112. On the opposite side of the diaphragm 101 is a connecting plate 113 which is secured against the diaphragm 101 by means of a screw bolt 114 adapted to be received within the threaded opening 112 of the pin element 101.

By having a sufficiently long hose connection 103, the automatic releasable device 98 may be located in a position removed from the other devices and at a location where the same readily serves as a stop element for the manually operable control rod 68. It is supported on a pedestal 115 which serves to support the steering mechanism 12. This connection with the pedestal 115 is made by means of a bracket structure 116 having an opening 117 through which extends the control rod 68. The walls in the opening 117 serve to retain the control rod 68 against lateral movement and thereby serve as a guide for the same. On the bracket structure 116 the latch element 97 is pivoted as indicated at 118. The latch element has a portion 119 adapted to be engaged by the plunger pin element 109 and also has a hook portion 120 adapted to hook over the lug 96 on the control rod 68.

When the fluid-actuated device has been operated and the latch element 97 has been rotated to disengage the hook portion 120 thereof from the lug 96, the control rod 68 is automatically returned to a neutral position by the coil spring 77 on the pivotal structure 76. This forward movement of the control rod 68 continues until a second lug portion 121 on the lower edge of the control rod engages with a lower edge portion 122 of the opening 117 in the manner shown in Figure 5. This forward movement of the control rod 68 is sufficient to cause the trunnion element 82 to engage with the stop 92 to effect forward movement of the link 83 to raise the closure plate 48 from the opening 49. The flow of the exhaust gases to the atmosphere is then continued. The duration over which the exhaust gases have been diverted is only sufficient to effect filling of the fluid-actuated device 28 with sufficient fluid to cause its operation. This is usually of very short duration and not sufficient to interfere with the operation of the internal combustion engine 45. If it was desired by the operator to merely raise the working tool a slight distance to adjust the same, this is done by the operator merely pulling rearwardly on the control rod 68 without effecting latching of the latch element 97 with the lug 96.

When it is desired to lower the implement, the operator need only to release the lug 121 from the opening edge portion 122. This is done by the operator pulling the same upwardly and over the opening edge portion 122 so that it slides through the opening 117. When this is done the link 69 is acted upon to cause rotation of the shaft 62 and the raising of the closure plate 60 of the trap valve device 56. The ring connection of the element 69, as indicated at 70, has permitted the links to slide upwardly along the control rod 68 for engagement with a cotter pin 123. The control rod will have then pushed forwardly the link 69 against the action of the spring 71 to effect a lifting of the closure plate 60 off its seat 61 to a position shown in Figures 7 and 8. The exhaust fluid then leaves the fluid-actuated device 28 by way of a trap valve device through the fluid communication 55 to the gas outlet means thereby returning by the same path over which it was delivered to the fluid-actuated device. It should also be apparent that this lowering movement can be effected in small steps so that by the mechanism an adjusting of the working tools can be effected. After the working tools have been lowered the control rod 68 will be returned to the neutral position by means of the spring 71 of the trap valve device 56.

Referring now to Figure 2, there is shown a modified form of manual operating mechanism 126 including a control handle 127 which is pivotally connected, as indicated at 127', to an element 128 carrying the lugs 129 and 130, corresponding respectively with the lugs 96 and 121 of the form of control rod arrangement shown in Figure 1. In effect the control rod 68 is shortened, and there is attached to the rearward end of the same the mechanism 126. The attachment is made as indicated at 131 and is adjustable along a threaded portion 132 of the control rod 68. This mechanism 126 includes a spring biased lost-motion connection means 133 adapted to replace the lost-motion connection means 81 of the linkage shown in the other figures and as heretofore described. The lever 127 pivoted to the element 128 is also pivoted at 134 to a part 135 rigidly connected to a supporting element 136 through which the element 128 is slidable. This supporting element 136 is in turn connected to the rod 68 by the adjustable means 131. The supporting piece 136 has an upwardly turned portion 137 with an opening therethrough, and a spring 138 coiled on the element 128 and secured by a cotter pin 138' will react against this portion 137. The lever element 127 is arranged to have a mechanical advantage when pulled rearwardly by the operator grasping handle portion 139 so that the spring 138 may be more easily compressed than the spring 87 in the form of linkage shown in the Figures 1 and 3. The coil spring 77 of the pivotal structure 76 is also more readily overcome by operating means of this form. With this arrangement the mechanism 126 and rod 68 are pulled back bodily a certain distance, and just prior to the time when the lug 129 reaches the hook 120 the valves will have been operated and further movement of the handle portion 139 rearwardly compresses the spring 138. Since the compressing force is done by lever action of the lever 127, the effort incumbent on the operator is not so great as with the form of arrangement shown in Figures 1 and 3.

It should now be apparent that control mechanism has been provided for operation with a fluid power mechanism of a type adapted for use with internal combustion engines, wherein there is provided an automatic releasable device which tends to render the entire control mechanism automatic in its operation and which at the same time serves as a stop means for the positioning of a manually operable control linkage. It should also be apparent that there has been provided a linkage for control mechanism which is extensible but which includes a spring biased lost-motion connection means serving to place a bias on an operative valve and at the same time to serve in the maintaining of the control linkage against a stop means.

While various changes may be made in the detail construction, it should be understood that such changes shall be within the spirit and scope of the present invention, as defined by the appended claims.

What is claimed is:

1. In a fluid power arrangement, means providing a fluid pressure source, a fluid-actuated device in communication with the fluid pressure source, valve means for controlling the flow of fluid from the fluid source to the fluid-actuated device, said valve means being closed against the fluid pressure to cause the fluid to be diverted to the fluid-actuated device, stop means, a linkage for closing the valve means including a manually operable, axially movable control rod, a spring biased lost-motion connection means serving jointly to place a bias on the rod against the stop means and on the valve means in its closed position, and a hand-operated lever mechanism carried on the control rod and bodily movable therewith until the valve means has been operated, said mechanism being operable at near the end of the axial movement of the control rod to counteract the action of the spring biased lost-motion connection means whereby due to lever action the locking of the control rod with the stop means is facilitated.

2. In a control mechanism, an operatable part adapted to be controlled in its operation, a linkage connected to said part and manipulatable for operating the same and including a spring biased lost-motion means in the linkage to permit the same to be stretched when the linkage is manipulated beyond a predetermined limit at which said part is operated, stop means serving to retain the linkage in such manipulated position, engagement means on the linkage adapted to be seated over the stop means when the linkage is so stretched, a manually operable lever pivotally on the linkage to be bodily movable therewith in such manipulation until the controlled part has been operated and said predetermined limit has been reached, and means connecting the lever with said spring biased lost-motion means to preclude pivotal movement of the lever so that force is applicable thereto for manipulating the linkage to said limit and to stretch the linkage as aforesaid pursuant to pivotal movement of the lever after said limit is reached, to facilitate the seating of said engagement means over said stop means to maintain the linkage in the manipulated condition.

3. In a fluid power arrangement, an internal combustion engine having an exhaust fluid outlet means, a fluid-actuated device connected to the exhaust fluid outlet means to receive the exhaust fluid therefrom, valve means for causing the exhaust fluid from the exhaust outlet means to be diverted to the fluid-actuated device including a manually operable control rod movable to a position to cause the exhaust fluid to flow to the fluid-actuated device, and exhaust pressure releasable means associated with the control rod and serving as a stop means for retaining the control rod in its moved position but releasable upon a predetermined pressure being reached to permit return of the control rod from its moved position whereby the flow of exhaust fluid to the fluid-actuated device will be automatically discontinued.

4. In a fluid power arrangement, an internal combustion engine having an exhaust fluid outlet means, a fluid-actuated device connected to the exhaust fluid outlet means to receive exhaust fluid therefrom, valve means associated with the outlet means for interrupting the normal flow of the exhaust fluid to the atmosphere to cause the same to be diverted to the fluid-actuated device, stop means, a linkage adapted for manually closing the valve means including a manually operable control rod adapted to cooperate with the stop means to hold the valve means closed against the normal flow of the exhaust fluid, and a spring biased lost-motion means therein serving jointly to place a bias of the control rod against the stop means and on the valve means in its closed position.

5. In a fluid power arrangement, an internal combustion engine having an exhaust fluid outlet means, a fluid-actuated device connected to the exhaust fluid outlet means to receive exhaust fluid therefrom, valve means associated with the outlet means for interrupting the normal flow of the exhaust fluid to the atmosphere to cause the same to be diverted to the fluid-actuated device, stop means, a linkage adapted for manually closing the valve means including a manually operable control rod adapted to cooperate with the stop means to hold the valve means closed against the normal flow of the exhaust fluid, and a spring biased lost-motion means therein serving jointly to place a bias of the control rod against the stop means and on the valve means in its closed position, and a manually operable lever pivoted on the control rod to have a mechanical advantage and operable to counteract the action of spring means when the control rod is locked with the stop means.

6. In a valve control arrangement, a valve adapted to be operated, a control mechanism for operating the valve including an extensible linkage with a spring biased lost-motion means therein, means for locking the valve against the action of the spring biased means, said locking means including a lever bodily carried by the linkage, and means for connecting the lever to the spring biased lost-motion means to effect lever action upon the same as the linkage is extended to lock the valve in its operated position.

7. In a valve control arrangement, a valve adapted to be operated, a control mechanism for operating the valve including an extensible linkage with a spring biased lost-motion means therein, means for locking the valve against the action of the spring biased means, said locking means including a lever bodily carried by the linkage, means for connecting the lever to the spring biased lost-motion means to effect lever action upon the same as the linkage is extended to lock the valve in its operated position, and automatic means for unlocking the locking means after an interval of time to permit return of the linkage and valve to their original positions.

8. In a valve control arrangement, a valve adapted to be operated, a manual control mechanism for operating the valve including an extensible linkage with a spring biased lost-motion means therein, engagement means on the linkage, and stop means over which the engagement means can be placed to retain the valve in its operated position against the action of the spring biased lost-motion means.

9. In a valve control arrangement, a valve adapted to be operated, a manual control mechanism for operating the valve including an extensible linkage with a spring biased lost-motion means therein, engagement means on the linkage, stop means adapted to retain the engagement means and the valve in its operated position, and means adapted to act upon the stop means for automatically releasing the engagement means after an interval of time.

CARL W. MOTT.